US008338811B2

(12) United States Patent
Lang et al.

(10) Patent No.: US 8,338,811 B2
(45) Date of Patent: Dec. 25, 2012

(54) OPTICAL LEVEL DETECTOR FOR A BEVERAGE MACHINE

(75) Inventors: Markus Lang, Wabern (CH); Peter Möri, Walperswil (CH); Renzo Moser, Gümmenen (CH)

(73) Assignee: Nestec S.A., Vevey (CH)

( * ) Notice: Subject to any disclaimer, the term of this patent is extended or adjusted under 35 U.S.C. 154(b) by 479 days.

(21) Appl. No.: 12/721,313

(22) Filed: Mar. 10, 2010

(65) Prior Publication Data
US 2010/0229973 A1 Sep. 16, 2010

(30) Foreign Application Priority Data

Mar. 10, 2009 (EP) .................................... 09154774

(51) Int. Cl.
  *G01N 15/06* (2006.01)
  *G01N 21/49* (2006.01)
  *G01N 21/85* (2006.01)
(52) U.S. Cl. ........................... 250/577; 73/293; 141/198
(58) Field of Classification Search .................. 250/577; 73/293; 141/198
  See application file for complete search history.

(56) References Cited

U.S. PATENT DOCUMENTS

| 3,094,213 A | 6/1963 | Wyman ....................... 209/111.5 |
| 4,733,095 A * | 3/1988 | Kurahashi et al. ............. 250/577 |
| 4,880,982 A | 11/1989 | Hoksaas ........................ 250/577 |
| 6,098,029 A * | 8/2000 | Takagi et al. .................. 702/127 |
| 6,166,630 A | 12/2000 | King ........................... 340/450.2 |
| 6,546,794 B2 * | 4/2003 | Kim et al. ........................ 73/597 |
| 7,017,408 B2 | 3/2006 | Ramus et al. .................... 73/293 |

FOREIGN PATENT DOCUMENTS

| DE | 102 01 768 A1 | 6/2003 |
| FR | 2 672 390 A1 | 8/1992 |
| GB | 1 553 642 | 10/1979 |
| GB | 2 147 697 A | 5/1985 |
| GB | 2 212 908 A | 8/1989 |
| JP | 2000-329609 A | 11/2000 |
| WO | WO 99/66295 | 12/1999 |

OTHER PUBLICATIONS

European Search Report, EP 09 15 4774, mailed May 4, 2009.

* cited by examiner

*Primary Examiner* — Seung C Sohn
(74) *Attorney, Agent, or Firm* — Winston & Strawn LLP

(57) ABSTRACT

A level detection device for detecting an upper surface of a liquid at a reference level. The device includes a reservoir having a bottom wall and one or more side walls that delimit a cavity for containing the liquid; a light emitter for emitting a light beam towards this cavity; at least one reflection surface for reflecting the light beam; and a light detector for detecting the emitted light beam upon reflection. The emitter and detector are so arranged that, when the surface of the liquid passes the reference level, a state of detection of the light beam by the detector is changed. The emitter, detector and reflection surface(s) are so located and oriented relative to the cavity that the emitted light beam is: detectable by the detector upon travelling through the liquid in the cavity; and refractable at the surface of the liquid towards or away from the detector so that the state of detection is a function of such refraction.

15 Claims, 4 Drawing Sheets

OPTICAL LEVEL DETECTOR FOR A BEVERAGE MACHINE

FIELD OF THE INVENTION

The field of the invention pertains to the optical level detection of a liquid in a reservoir, in particular a reservoir of a liquid food or beverage preparation machines. For the purpose of the present description, a "beverage" is meant to include any liquid food, such as tea, coffee, hot or cold chocolate, milk, soup, baby food, etc.

BACKGROUND ART

Certain beverage or food preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

Most beverage machines have a reservoir for containing and for the supply of a constituent of the beverage to be prepared, usually a liquid constituent such as water. However, other constituents may be contained in such reservoirs, in particular liquid concentrates or solid material such as coffee beans or ground coffee, etc.

Some of these machines include a level detector for detecting the level of the content in the reservoir and prevent any process using such a content when insufficient for carrying out the process and/or signalling to the user such a low level.

For instance, DE 102 01 768 discloses a beverage machine with a reservoir for containing a liquid and a detector for detecting a minimum level of fill. The reservoir has a wall with an angled protruding two-part section or corner at the minimum level of fill. The level detector includes a light emitter and a light detector arranged on either side of this two part section. Light emitted by the emitter extends via a first part of this angled section into the reservoir cavity and, when the light passes through air instead of this liquid i.e. after the liquid has reached the minimum level in the reservoir, the emitted light exits through the second part of this angled section to hit the detector. JP 2000-329609 discloses a similar optical level detector for sensing a level of syrup in a reservoir of a vending machine. In both disclosures, the emitter and detector are located adjacent each side of an angled section or corner of the reservoir, the level of fill of which is to be detected. A problem with these embodiments resides in the fact that the emitter and detector are located on different faces of the reservoir which complicates the arrangement of the light emitter and detector and connections thereof to a control unit, in particular to a printed circuit board whose shape will normally not follow the shape of the angled section or corner about which emitter and detector are placed.

Another solution is disclosed in U.S. Pat. No. 7,017,408, in which a beverage maker has a housing with a lid element that is movable against the mouth of a liquid container. The lid element includes a light emitter and a light detector, the emitter emitting onto the surface of the liquid an inclined light beam that is reflect onto the detector when the liquid is at a certain level. A problem with this approach resides in the fact that the emitter and detector are mounted in a movable component of the beverage maker, which involves complications with the connection between the emitter, detector and the fixed control unit of the beverage maker. Moreover, such a emitter-detector arrangement operating with a reflection on the liquid surface can hardly be located anywhere else than above the surface which also increases the complexity of the connections of the emitter-detector to a control unit.

GB 1 553 642 discloses an embodiment of a liquid level detector having a light emitter and a light detector mounted into the base of a triangular refractor. This refractor further includes two converging planes which are opposite the emitter and detector and which are fitted into the cavity of a reservoir for containing a liquid. When the level of liquid is below the refractor, light emitted by the emitter inside the refractor is substantially reflected by the facing angled planes into the detector. Conversely, when the level of liquid is above the refractor, i.e. the converging planes are immersed in the liquid, the light emitted by the emitter being substantially refracted through the converging planes into the liquid instead of being reflected back into the detector. A problem with this embodiment lies in the fact that the triangular refractor protrudes into the liquid in the reservoir and is directly exposed thereto and thus requires occasional cleaning, including for removing scale deposits. Moreover, this triangular refractor protruding inside the cavity of the reservoir i.e. rendering the cavity of the reservoir non-convex, complicates the cleaning of such cavity. FR 2 672 390 discloses a similar level detector in which the triangular refractor is located in a lid of a container of a household apparatus, such as an air conditioner. Thus, improvements in these type devices are desired.

SUMMARY OF THE INVENTION

The present invention thus provides an optical level detector that alleviates at least some of the prior art drawbacks. This is achieved by providing a level detector that includes a light emitter for emitting a light beam through the cavity of a reservoir containing a liquid, typically water, the level or upper surface of which is to be monitored. The level detector further has a light detector and a beam deflection arrangement for deflecting the emitted light beam onto or away from the light detector. In order to be able to maintain the light emitter and light detector relatively close together while avoiding protruding or intrusive prism elements extending into the cavity, the beam deflection arrangement is based on: a light refraction principle that changes the path of the beam depending on the position of the surface of the liquid in the cavity; and a reflection or mirror principle that reflects the emitted beam generally the light detector.

Hence, the invention relates to a level detection device for detecting an upper surface of a liquid at a reference level. This device includes: a reservoir having a bottom wall and one or more side walls extending from the bottom wall for delimiting this cavity; a light emitter for emitting a light beam towards this cavity; at least one reflection surface for reflecting the light beam; and a light detector for detecting the emitted light beam upon reflection. The emitter and detector are so arranged that, when the surface of this liquid is at a reference level, a state of detection by the detector of the deflected light beam is changed.

For instance, as long as the liquid surface is above a minimum reference level, for example a minimum level for the delivery of the liquid from the reservoir, or below a maximum reference level, for instance a maximum level of fill of the reservoir, the emitted light beam is deflected away from the detector. When the liquid surface passes such a reference level, the light beam is deflected onto the detector and changes the state of detection. The inverted configuration, i.e.

detection of the light beam before passing the reference level and lack of detection thereafter, is also contemplated.

In accordance with the invention, the emitter, detector and reflection surface(s) are so located and oriented relatively to the cavity that a light beam is detectable by the detector upon travelling through the liquid in the cavity; and refractable at the surface of the liquid towards or away from the detector so that the state of detection by the detector is a function of such refraction.

In other words, the change of the state of detection depends on the level (or location of the surface) of the liquid and a corresponding refraction of the beam on the surface of the liquid which affects the path of the beam onto or away from the detector.

In the present context, a deflection of the light beam means that the light beam changes direction at an interface between two different media, e.g. an air-liquid interface, i.e. the surface of the liquid, a reservoir-liquid interface or an air-reservoir interface. A reflected beam is a beam that is deflected and remains in the same media at deflection on the interface. A refracted beam is a beam that is deflected and changes media at deflection on the interface.

The emitter, detector and reflection surface(s) can be so arranged that the light beam is refractable at the liquid surface onto the detector via at least one of the reflection surface(s), the light beam being optionally reflectable onto a further reflection surface before being refracted. The emitter, detector and reflection surface(s) may be arranged so that the light beam is reflectable on at least one of the reflection surface(s) and then refractable without further reflection onto or away from the detector.

In one embodiment, the emitter, detector and reflection surface(s) are so located and oriented relative to the cavity that a light beam emitted by the emitter and detected by the detector travels through the cavity for refraction at the surface of the liquid before and/or after being reflected by the reflection surface(s).

The reservoir can be removable and the level detector device may be so arranged that the state of detection of the light beam—after the surface of the liquid has passed the reference level and the state of detection correspondingly changed—remains in this state of detection upon removal the reservoir. For instance the level detector device is so configured that: the light beam is returned onto the detector after the surface of the liquid has passed the reference level, the device comprising a further reflection surface for reflecting the light beam onto the detector upon removal of the reservoir; or the light beam is not returned onto the detector after the surface of the liquid has passed the reference level, the light beam being not returned onto the detector upon removal of the reservoir.

The level detection device typically comprises a printed circuit board (PCB), in particular bearing a control unit. The emitter usually has a light generator component, e.g. an optical source such as an LED or an IR diode, that can be rigidly mounted on the PCB and the detector has a light sensor, such as a photo sensor, that may also be rigidly mounted on the PCB.

The emitter and detector may operate with any wave length appropriate to interact with the reflection surface(s) and the liquid contained in the cavity, in particular in the infrared light spectrum.

Normally, the reservoir is transparent to the emitted light beam at least in those areas where a light beam has to travel from the emitter to the detector. The reflection surface may be a polished reflecting surface of the reservoir, for instance made of glass or an appropriate plastic material such as PC, SAN or PMMA, or it may be formed by a layer or film of light reflecting material such as a metallic film or layer. The latter additional layer or film is not necessary when the reservoir is made of an appropriately polished material at the reflection area.

Typically, the emitter includes an output for delivering a light beam into the reservoir and/or the detector includes an input for receiving a light beam from the reservoir. In an advantageous embodiment, the emitter has an output and the detector has an input, the output and input being aligned in or adjacent a single sidewall or bottom wall or top wall of the reservoir and/or on a segment extending outside the cavity of the reservoir.

Usually, the emitter includes a light guide having an output for guiding and delivering a light beam to the reservoir and/or the detector includes a light guide having an input for receiving and guiding a light beam from the reservoir. The light guide may be made of PMMA, PC or SAN.

To simplify cleaning of the cavity, for instance for removing scale, the cavity of the reservoir can be convex. Avoiding additional edges within the cavity also reduces local accumulation of scale along such edges.

The level detection device of the invention thus permits the use of a simplified configuration and connection of the emitter and detector, i.e. directly on a PCB adjacent the reservoir without having to provide a complex connection arrangement for the emitter and/or detector around the reservoir and/or at distant locations of the reservoir, and without having to provide non-convex cavity, e.g. resulting from the use of an additional component extending into the cavity such as a refractor prisms, like in the above cited prior art.

The reflection surface(s) are usually associated with the reservoir, the reflection surface(s) being optionally integral with the reservoir and/or forming a surface thereof, typically an outer or inner surface of the reservoir. At least one of such reflection surface(s) may be located in or on the bottom wall, the side wall(s) and/or a top wall of the reservoir. In another embodiment, the reflection surface may also be inside a wall of the reservoir, e.g. a sidewall or the bottom wall.

A reflection surface(s) may be located outside the cavity of the reservoir and optionally it can form an outside surface of the bottom wall or of a sidewall. This configuration is advantageous to avoid exposure of the reflection surface(s) to the liquid contained in the cavity and thus it reduces wear and need for cleaning, especially when the liquid is not water but for example syrup or another concentrate.

In a less preferred embodiment, at least one of such reflection surface(s) delimits the cavity of the reservoir.

The level detection device may include a plurality of reflection surfaces, for example two or three reflection surfaces, so arranged that an emitted light beam is reflected several times before being detected by the detector.

In one embodiment, the emitter and the detector are located along a reservoir sidewall, at least one of such reflection surface(s) being located on the bottom wall or a top wall of the reservoir. In this case, a light beam can be directed from a sidewall to the bottom or top of the receptacle and then reflected back from the bottom or top to the sidewall. For instance, the emitter, the detector and such reflection surface (s) can be located adjacent a top corner or the bottom corner of the cavity formed by a sidewall and a top wall or a bottom wall, respectively. This reduces the length of the path of the light beam through the reservoir and reduces problems of positioning tolerances and unwanted deviations of the light beam.

The emitter, the detector and at least one of the reflection surface(s) may be located on at least one reservoir sidewall, in particular on two facing or adjacent sidewalls, the cavity extending between: the reflection surface(s); and the detector and emitter.

The emitter can be located and oriented to emit a light beam entering at an non-perpendicular angle into the cavity. An inclination of the beam may be required for the refraction of the light beam and deriving the position of the liquid surface therefrom. However, the inclination may result from an appropriate reflection of the light beam on a reflection surface.

Such a level detection device for detecting a surface of a liquid contained in a cavity at a reference level, as described above, may typically be used in a liquid food or beverage machine for detecting a low level of ingredient, e.g. water or beverage or food concentrate, in a supply reservoir of the machine.

For example, the machine is a coffee machine, in particular for the preparation of coffee by passing water circulated from a water reservoir to a coffee brewing chamber. The brewing chamber may be arranged to receive capsules or pods of pre-portioned coffee, as known in the art.

BRIEF DESCRIPTION OF THE DRAWINGS

The invention will now be described with reference to the schematic drawings, wherein.

DETAILED DESCRIPTION OF THE INVENTION

Figure 1A:
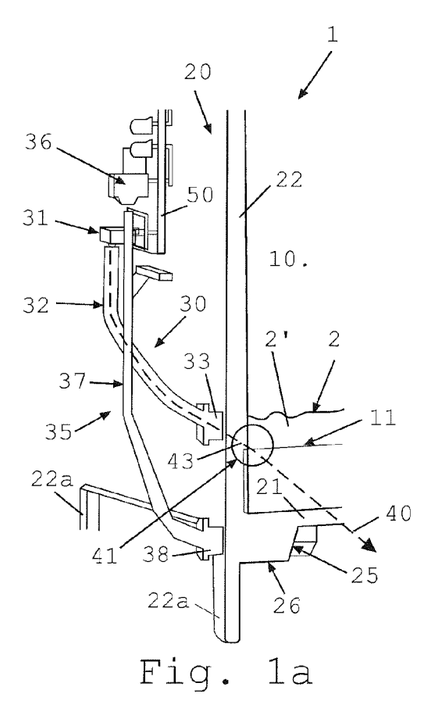
FIGS. 1a and 1b show part of a level detection device according to the invention.
Figure 1B:
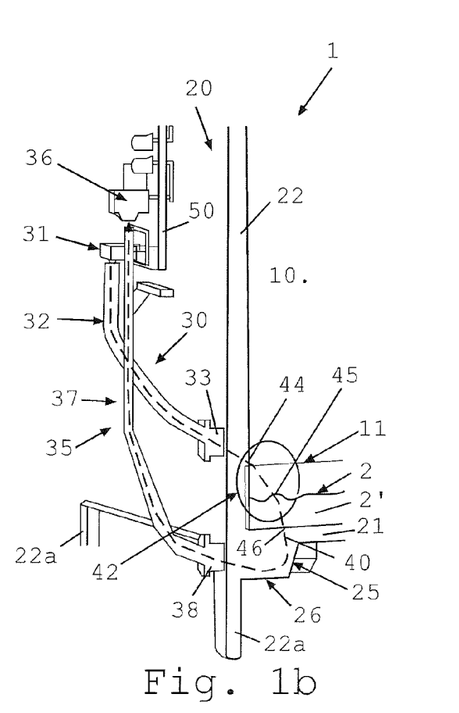

FIGS. 1a and 1b show part of a perspective view of a level detection device 1 for detecting a level or upper surface 2 of a liquid 2' contained in a cavity 10 at a reference level 11.

Device 1 has a reservoir 20 with a bottom wall 21 and one or more sidewalls 22 extending from bottom wall 21 for delimiting cavity 10. Sidewalls 22 are provided with feet 22a for supporting reservoir 20.

A light emitter 30 for emitting a light beam 40 towards and into cavity 10 has: a light source 31 typically of the IR type or a LED; a light guide 32 for guiding light emitted by light source 31 into one end of guide 32; and, at the other end of guide 32, an output 33 adjacent sidewall 22 of reservoir 20. Emitter 30 is so located and oriented adjacent wall 22 of reservoir 20 that light beam 40 enters at an non-perpendicular angle into cavity 10.

Reservoir 20 is made of material transparent to light beam 40 so that output 33 delivers light beam 40 into cavity 10 via sidewall 22.

Bottom wall 21 is associated with two successive reflection surfaces 25,26 for reflecting light beam 40 as a function of the location of surface 2 of liquid 2'. As shown, reflection surfaces 25,26 are integral with bottom wall 21 of reservoir 20 and form an outer surface thereof. Hence, reflection surfaces 25,26 are not exposed to liquid 2' and will require less cleaning and will be exposed to less wear.

A light detector 35 for detecting light beam 40 upon reflection on reflection surfaces 25,26 and exit from reservoir 20 has: a light sensor 36 at one end of a light guide 37; and, at the other end thereof, a light beam input 38 adjacent sidewall 22 of reservoir 20, just below light beam output 33.

As illustrated in FIG. 1b, light beam 40 detected by detector 35 is reflected twice by surfaces 26,27 before reaching detector 35.

Emitter 30 and detector 35 are so arranged that, when surface 2 of liquid 2' is at reference level 11, a state of detection by detector 35 of light beam 40 is changed. As can be seen on FIG. 1a, when liquid 2' is at a level 2 higher than reference level 11, light beam 40 is not reflected via surfaces 25,26 to detector 35 so that the light beam detection state at this level 2 is null. Conversely, when liquid 2' is at a level 2 lower than reference level 11, as shown in FIG. 1b, light beam 40 is reflected via surfaces 25,26 to detector 35 so that the light beam detection state at this level 2 is non-null or positive.

As illustrated in FIG. 1b, emitter 30, detector 35 and reflections surfaces 25,26 are so located and oriented relative to cavity 10 that light beam 40 emitted by emitter 30 and detected by detector 35 travels through cavity 10 for refraction at an interface 2 of liquid 2', in particular before being reflected by reflection surfaces 25,26.

Emitter 30, detector 35 and reflection surfaces 25,26 are located adjacent a bottom corner of the cavity 10 formed at the junction of sidewall 22 and bottom wall 21. Light source 31 and light sensor 36 are rigidly mounted on a PCB 50 and connected to a control unit (not shown) thereof. As shown, PCB 50, light emitter 30 and light detector 35 are located along a single upright sidewall 22 so that the assembly of these components is spatially as simple as possible. Rigid light guides 32,37 may easily be shortened or extended depending on the dedicated location of PCB 50 and the entry and exit points of light beam 40 on reservoir 20. With such a simple configuration, emitter 30 and detector 35 may be directly mounted on PCB 50 prior to assembly within the level detection device and the machine into which it should be incorporated, which significantly simplifies the manufacturing process.

Emitter 30, detector 35 and reflection surfaces 25,26 are located adjacent a bottom corner of the cavity 10 formed at the junction of sidewall 22 and bottom wall 21. By providing such a reflection arrangement, cavity 10 may be maintained convex so as to avoid any access difficulties, in particular for cleaning or removing scale from cavity 10.

Such level detection device 1 may be implemented in a liquid food or beverage machine, in particular a coffee machine, such as machines for the extraction of a pre-portioned beverage ingredient, e.g. ground coffee, from a capsule or pod by passing heated water therethrough. Hence, reservoir 20 may typically be designed to contain a supply of water for such liquid food or beverage machines.

In order to notify a user that reservoir 20 should be refilled and/or to prevent drawing liquid 2', e.g. water, when reservoir 20 is empty or contains insufficient liquid 2', detection device 1 is configured to detect the passage of surface 2 of liquid 2' at reference level 11.

For this purpose, light beam 40 emitted by emitter 30 into cavity 10 is deflected by refraction at the interface of liquid 2'. As long as surface 2 is above reference level 11, as shown in FIG. 1a, the total deflection angle 41 of beam 40—resulting from a refraction 43 thereof by the interface between wall 22 and liquid 2'—is insufficient to direct beam onto reflection surfaces 25,26. In such a case, beam 40 will not be directed into detector 35 and will thus not be detected.

When liquid surface 2 is lowered down to reference level 11 and is even further lowered as shown in FIG. 1b, the total deflection angle 42 of beam 40 is greater than angle 41 and results from a first refraction 44 at an interface between sidewall 22 and the air as well as a second refraction 45 at an interface 2 between the air and liquid 2'. This is followed by a third refraction 46 at the interface between liquid 2' and bottom wall 21. With these successive refractions 44,45,46 light beam 40 is sufficiently deflected to reach reflection surface 25 and then reflection surface 26 before being received by input 38 of detector 35.

Once beam 40 is guided by guide 37 to light sensor 36 and sensed thereby, sensor 36 sends a corresponding signal to the control unit on PCB 50 which will then initiate the appropriate process, e.g. notify a user of the low water level and/or prevent the start of any process that would require an amount of liquid 2' that is insufficiently available in reservoir 20.

The height span of level 2 within which the beam will be returned to detector 35 will depend on the diameter of light input 38 of detector 35 and on the specific deflection light path. The greater the distance of the refraction and/or reflection location to the light input 38 the smaller will normally be the detection height span.

FIGS. 2a to 5b, in which the same numeric references designate the same or similar elements, schematically illustrate several variations of the particular embodiment of the invention shown in FIGS. 1a and 1b.

For the purpose of simplification, the refraction of beam 40 will not be further discussed in relation with the interfaces between liquid 2' or air and walls 21,21',22,22" of reservoir 20.

Figure 2A:
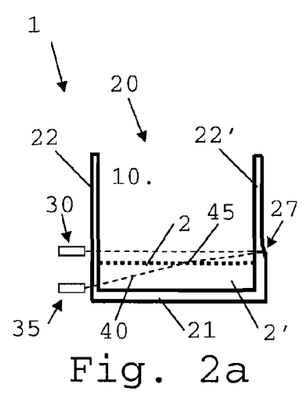
FIGS. 2a to 2c schematically illustrate a variation with a sub-variation according to the invention of a level detection device.
Figure 2B:
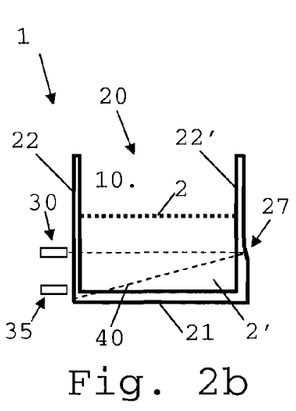
Figure 2C:
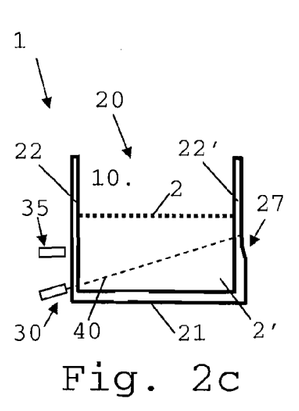

In FIGS. 2a-2c, device 1 has emitter 30 and detector 35 side-by-side adjacent a first sidewall 22 and a reflection surface 27 forming an outer face of a second sidewall 22' facing first sidewall 22 and spaced apart therefrom by cavity 10.

In FIG. 2a, surface 2 is below the minimum reference level (not shown) so that light beam 40 emitted horizontally by emitter 30 is reflected downwards by inclined reflection surface 27 onto interface 2 between the air and liquid 2' and undergoes a refraction 45 that directs beam 40 onto detector 35.

FIG. 2b illustrates the same device 1 with a surface 2 of liquid 2' that is located above the minimum reference level (not shown). In this case, no refraction takes place at surface 2 and beam 40 is directed from reflection surface 27 onto bottom wall 21 instead of being directed onto detector 35.

FIG. 2c illustrates a variation of the embodiment shown in FIG. 2b, in which emitter 30 and detector 35 are inverted and reoriented correspondingly. In this case, surface 2 of liquid 2' is above the minimum reference level and beam 40 is directed from emitter 30 to a non reflective part of sidewall 22' instead of reflection surface 27. It will be apparent to the skilled person that it is not decisive for the level detection whether emitter and detector are inverted. It is in particular irrelevant whether a beam is first reflected and then refracted or vice versa. However, in FIG. 2b the non detected beam 40 ends in bottom wall 21 whereas in FIG. 2c the non detected beam 40 ends in sidewall 22'. One or the other may be preferred depending on the general configuration of the machine in which such a device 1 is integrated, for instance to avoid unwanted light emissions outside the device.

Figure 3A:
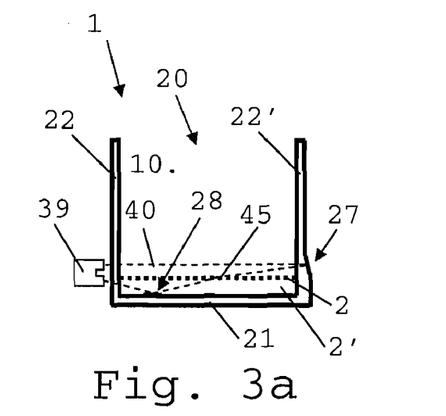
FIGS. 3a and 3b, on the one hand, and FIGS. 4a and 4b, on the other hand, schematically show two further variations according to the invention of a level detection device.

In FIG. 3a, a low level 2 of liquid 2' is detected by deflecting emitted beam 40 via: a first reflection on an outer face 27 of a sidewall 22'; a refraction 45 like in the previous embodiment; and a second reflection via an inner reflection face 28 on bottom wall 21.

Figure 3B:
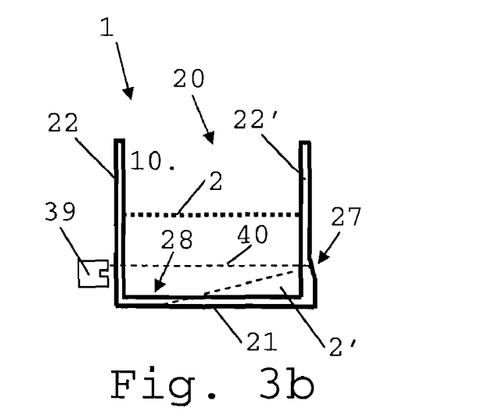

In FIG. 3b, level 2 of liquid 2' is located above a minimum reference level (not shown) and beam 40, upon the first reflection at reflection surface 27 is not refracted via interface 2 but remains in the same medium until it reaches bottom wall 21 at a location away from second reflection surface 28. Hence beam 40 is not returned to light detector 35.

Furthermore, as shown in FIGS. 3a and 3b, emitter and detector are united in a single component 39. The particular configuration resulting from the combination of the reflection and refraction permits to physically unit these two parts since the entry point of beam 40 into reservoir 20 can be located very close to its exit point. This leads to a simplification of the manufacturing process of device 1.

Figure 4A:
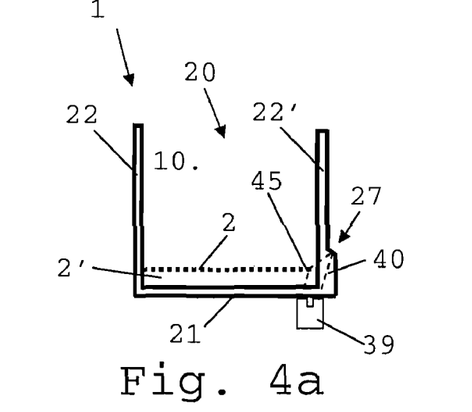
Figure 4B:
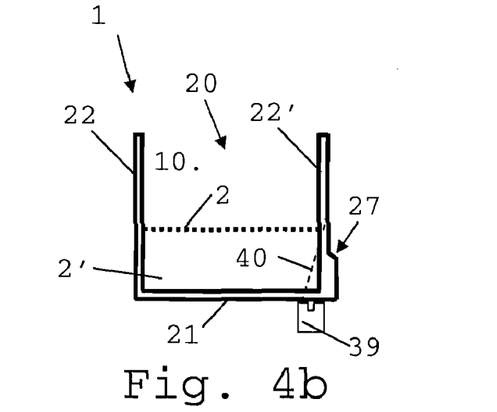

FIGS. 4a and 4b illustrate another variation of the deflection path, the emitter and detector device 39 corresponding to the device shown in FIGS. 3a and 3b but located underneath bottom 21 of reservoir 20 and oriented upwards.

The embodiment shown in FIGS. 4a and 4b has a single reflection surface 27 and forms an inclined outer face of sidewall 22'.

Emitter and detector device 39 as well as reflection surface 27 are located adjacent and about a bottom corner of the cavity 10 formed at the junction of sidewall 22' and bottom wall 21. Emitter and detector device 39 may be rigidly mounted on a PCB (not shown) and connected to a control unit thereof Such a PCB may extend underneath bottom wall 21 in the vicinity of device 39 to optimise the manufacturing and assembly of the system and avoid connections extending around reservoir 20 as well as the multiplication of electronic components that must be mounted separately in the system.

In FIG. 4a, liquid surface 2 is located below a minimum reference level (not shown). In this case, light beam 40 emitted by device 39 at a light delivery output into cavity 10, undergoes a refraction 45 at liquid surface or interface 2 in cavity 10 and is then deflected on reflection surface 27 back onto device 39 via a bottom part of sidewall 22' and a peripheral part of bottom wall 21, which form the abovementioned bottom corner of cavity 10.

In FIG. 4b, surface 2 of liquid 2' is located above the minimum reference level (not shown). In this case, light beam 40 emitted by device 39 is not refracted via interface 2 onto reflection surface 27. Hence, light beam 40 is not reflected back onto device 39.

Figure 5A:
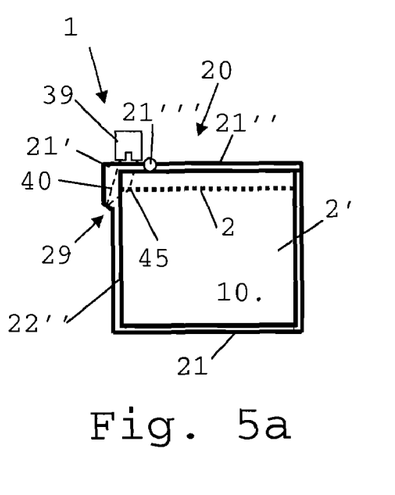
FIGS. 5a and 5b show part of yet a further level detection device according to the invention.
Figure 5B:
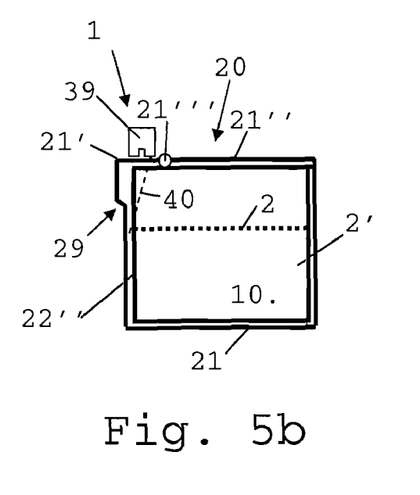

FIGS. 5a and 5b illustrate a further embodiment of the invention for detecting a maximum level of fill (not shown). Typically the device may be used for measuring the level of fill of a mug in a drip coffee percolator machine or a so-called American coffee machine.

Reservoir 20 has a top wall 21' fixed on sidewall 22" and a movable lid 21'" connected via a hinge 21'" to top wall 21'.

Sidewall 22" has an outer inclined reflection face in the form of an applied mirror film 29 in the vicinity of top wall 21'. Device 39 is located adjacent top wall 21' close to an upper corner formed by sidewall 22" and top wall 21'.

As shown in FIGS. 5a and 5b, the deflection path of light beam 40 is similar to the one illustrated in relation with FIGS. 4a and 4b upon rotation of the device by 180°.

In FIG. 5a, surface 2 has reached a maximum reference level of fill (not shown) in cavity 10 and light beam 40 emitted by device 39 is thus returned via refraction interface 2 and reflection mirror 29 to device 39 which hence senses the returned light beam 40, indicating that the reference level of fill has been reached.

In FIG. 5b, surface 2 is below the reference level (not shown) and light beam 40 is not refracted onto reflection mirror 29. In this case, device 39 will not sense any returned light beam indicated that the cavity is not full.

When cavity 10 is full, i.e. the reference level has been reached by surface 2 of liquid 2', a control unit (not shown) to which device 39 is connected can then end the filling process of reservoir 20, which may be a coffee mug for a drip coffee apparatus.

Even though these embodiments, as illustrated in FIGS. 1a to 5b, are arranged so that light beam 40 is returned to a light detector 35,39 once the reference level has been reached, it will be apparent to the skilled person that is possible to displace one or two of the emitter, detector and the reflection surface(s) so that the light beam is returned to the light detector until the reference level is reached and then, upon reaching the reference level, is deflected away from the light detector. This latter configuration is in particular appropriate when the reservoir needs to be removed upon reaching the reference level, for instance for emptying or refilling the reservoir, as the case may be. In such a case, since the light beam is no more returned to a light detector, removal of the reservoir will not change the state of detection of the light beam.

An alternative configuration of the level detection system providing the same effect can be arranged to return the light beam onto the detector only upon reaching the reference level, as illustrated in FIGS. 1a to 5b. However, a second reflection and/or refraction configuration would then be provided external to the reservoir, which would return the light beam onto the detector once the reservoir is removed for filling or emptying. Typically, the level detection device would be mounted in a housing on which the reservoir would be removably mounted. This housing would then include a reflection surface so arranged as to return the light beam to the detector if and when the reservoir is removed.

Figure 6A:
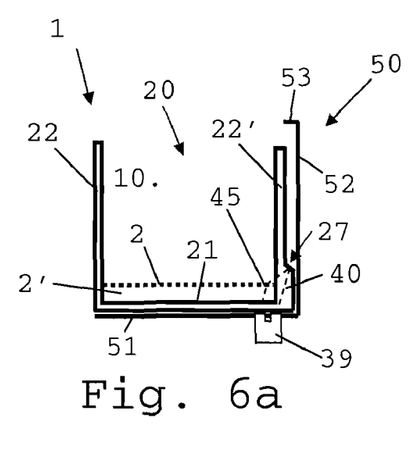
FIGS. 6a and 6b illustrate the device of FIGS. 4a and 4b having a dedicated seat for a reservoir according to the invention.
Figure 6B:
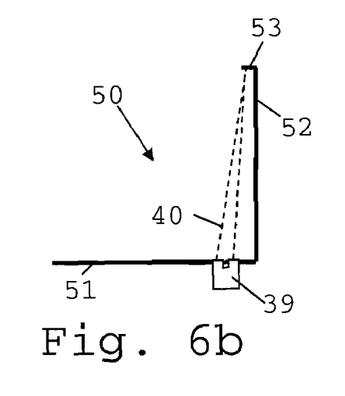

A corresponding embodiment is schematically illustrated in FIGS. 6a and 6b which shows the level detector of FIGS. 4a and 4b with a reservoir seat 50 incorporating emitting and detecting device 39 in its bottom 51. Seat 50 further has an optional upright wall 52 and a reflection surface 53 located generally facing device 39, e.g. generally above device 39. In FIG. 6a, level 2 of liquid 2' has reached the reference level whereby beam 40 is returned onto device 39 changing the state of detection, as discussed in relation with FIGS. 4a and 4b. When reservoir 20 is removed from seat 50, typically for being refilled with substance, beam 40 emitted by device 39 is reflected by surface 53 of seat 50 back onto device 39 so that the state of detection of beam 40 does not change from the moment when the minimum reference level is reached by liquid 2', while reservoir 20 is removed for refilling and until reservoir 20 is replaced into or onto seat 50 with liquid 2' at a level 2 above the minimum reference level. Consequently, when such a refilled reservoir is put back in place in seat 50, the state of detection of beam 40 is changed, e.g. as illustrated in FIG. 4b.

Such a configuration with a seat having a reflection surface may be combined with any of the embodiments illustrated in FIGS. 1a to 5b.

Hence, such embodiments in which the state of detection of the light beam is not changed when the reservoir is removed upon reaching the reference level may be particularly appropriate for detecting a minimum level in a water or other ingredient reservoir of a liquid food or beverage machine, in particular a coffee machine. In this case, the level detector may be used to indicate to the user, via an appropriate interface, that the machine may not be operated until the reservoir is partly or fully refilled.

Embodiments which are arranged to detect the reaching of a maximum reference level in a reservoir and maintain such a state of detection while the reservoir is removed for emptying thereof may be used in combination with a mug in a drip coffee percolator machine or a so-called American coffee machine. In this case, the level detector may be used to indicate to the user, via an appropriate interface, that the machine may not be operated until an empty or partly emptied reservoir is put in position.

What is claimed is:

1. A level detection device for detecting an upper surface of a liquid at a reference level, comprising:
    a reservoir having a bottom wall and one or more side walls extending from the bottom wall that delimit a cavity for containing the liquid;
    a light emitter for emitting a light beam towards the cavity;
    at least one reflection surface for reflecting the light beam; and
    a light detector for detecting the emitted light beam upon reflection, the emitter and detector being so arranged that, when the surface of the liquid passes the reference level, a state of detection of the light beam by the detector is changed,
    wherein the emitter, detector and reflection surface(s) are so located and oriented relatively to the cavity that the emitted light beam is:
    a) detectable by the detector upon travelling through the liquid in the cavity; and
    b) refractable at the surface of the liquid towards or away from the detector so that the state of detection is a function of such refraction.

2. The device of claim 1, wherein the emitter, detector and reflection surface(s) are so arranged that the light beam is:
    refractable at the liquid surface onto the detector via at least one of the reflection surface(s), the light beam being optionally reflectable onto a further reflection surface before being refracted; or
    reflectable on at least one of the reflection surface(s) and then refractable without further reflection onto or away from the detector.

3. The device of claim 1, wherein the reservoir is removable and wherein such device is so arranged that the state of detection of the light beam after the surface of the liquid has passed the reference level remains unchanged upon removing the reservoir, such device being optionally so configured that:
    the light beam is returned onto the detector after the surface of the liquid has passed the reference level, such device comprising a further reflection surface for reflecting the light beam onto the detector upon removal of the reservoir; or
    the light beam is no more returned onto the detector after the surface of the liquid has passed the reference level, the light beam being not detected by the detector upon removal of the reservoir.

4. The device of claim 1, which further comprises a printed circuit board (PCB), with the emitter having a light generator component rigidly mounted on the PCB and the detector having a light or photo sensor rigidly mounted on the PCB.

5. The device of claim 1, wherein the emitter comprises a light output for delivering a light beam into the reservoir or wherein the detector comprises a light input for receiving a light beam from the reservoir, optionally with the emitter and detector having respectively such a light output and light input that are aligned in or adjacent a single sidewall or bottom wall or top wall of the reservoir or that are aligned on a segment extending outside the cavity of the reservoir.

6. The device of claim 1, wherein the reflection surface(s) is/are part of, integral or associated with the reservoir or forming a surface thereof, at least one of the reflection surface(s) being optionally located in or on: the bottom wall; the side wall(s); or a top wall of the reservoir.

7. The device of claim 6, wherein at least one of the reflection surface(s) is located outside the cavity of the reservoir and optionally forms an outside surface of the bottom wall or of a sidewall or of a top wall.

8. The device of claim 6, wherein at least one of the reflection surface(s) delimits the cavity of the reservoir.

9. The device of claim 1, comprising a plurality of reflection surfaces so arranged that an emitted light beam is reflected several times before being detected by the detector.

10. The device of claim 1, wherein the emitter and the detector are located along a reservoir sidewall, at least one of the reflection surface(s) is located on the bottom wall or on a fixed or movable top wall or lid.

11. The device of claim 10, wherein the emitter, the detector and the at least one of the reflection surface(s) are located adjacent a bottom or top corner of the cavity (10) formed by a sidewall, and the bottom wall or a top wall.

12. The device of claim 1, wherein the emitter, the detector and at least one of the reflection surface(s) are located on at least one or reservoir sidewall(s), with the cavity extending between the reflection surface(s), the detector and the emitter.

13. The device of claim 1, wherein and the detector is so located and oriented to emit a light beam entering at a non-perpendicular angle into the cavity.

14. The device of claim 1, wherein the cavity of the reservoir is convex.

15. A liquid food or beverage machine comprising a device as defined in claim 1.

* * * * *